United States Patent
Bortolotto et al.

(10) Patent No.: US 10,607,210 B2
(45) Date of Patent: Mar. 31, 2020

(54) SYSTEMS, METHODS, DEVICES, AND COMPUTER READABLE MEDIA FOR ENABLING DIRECT ELECTRONIC PAYMENT TRANSFERS

(71) Applicant: MASTERCARD INTERNATIONAL INCORPORATED, Purchase, NY (US)

(72) Inventors: Paolo Bortolotto, Singapore (SG); Anna Libus, Surrey (GB); John McGuire, Galway (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 631 days.

(21) Appl. No.: 15/145,376

(22) Filed: May 3, 2016

(65) Prior Publication Data
US 2016/0328700 A1    Nov. 10, 2016

(30) Foreign Application Priority Data

May 5, 2015   (EP) ..................................... 15166486

(51) Int. Cl.
*G06Q 40/00*  (2012.01)
*G06Q 20/32*  (2012.01)
(Continued)

(52) U.S. Cl.
CPC ......... *G06Q 20/3226* (2013.01); *G06Q 20/32* (2013.01); *G06Q 20/3574* (2013.01);
(Continued)

(58) Field of Classification Search
CPC .................................................... G06Q 20/32
(Continued)

(56) References Cited

U.S. PATENT DOCUMENTS

2012/0158589 A1* 6/2012 Katzin .................. G06Q 20/12
                                                       705/44
2014/0129435 A1   5/2014 Pardo et al.
(Continued)

FOREIGN PATENT DOCUMENTS

EP    2 779 081 A1    8/2014
JP    2004-102711     4/2004
(Continued)

OTHER PUBLICATIONS

Mobilepaymentstoday.com: Payments in 10 years: Very different Publication info: Weblog post. Newstex Trade & Industry Blogs, Newstex. Jan. 9, 2015. (Year: 2015).*

(Continued)

*Primary Examiner* — Bruce I Ebersman
*Assistant Examiner* — John A Anderson
(74) *Attorney, Agent, or Firm* — Harness, Dickey & Pierce, P.L.C.

(57) ABSTRACT

Systems, methods, devices, and computer readable media for enabling direct electronic payment transfers are disclosed. Identification information of a payer, based on a user selection at a mobile device, is received from a first application installed on the mobile device. A user identification of a payment amount is received via a second application installed on the mobile device. The second application is different from the first application. Biometric data of the user is captured at a biometrics reader of the mobile device, and then compared to authorized biometric data to authenticate the user. Upon successful authentication of the user, a request for the electronic payment transfer from the payer to the user for the payment amount is initiated from the mobile device.

15 Claims, 7 Drawing Sheets

(51) Int. Cl.
    *G06Q 20/40* (2012.01)
    *G06Q 30/02* (2012.01)
    *G06Q 20/36* (2012.01)
    *G06Q 20/34* (2012.01)

(52) U.S. Cl.
    CPC ........... *G06Q 20/36* (2013.01); *G06Q 20/405* (2013.01); *G06Q 20/40145* (2013.01); *G06Q 30/0279* (2013.01)

(58) Field of Classification Search
    USPC ...................................................... 705/35–44
    See application file for complete search history.

(56) References Cited

U.S. PATENT DOCUMENTS

2014/0222664 A1* 8/2014 Milne .................... G06Q 20/10 705/39
2014/0379391 A1 12/2014 Lulic et al.
2015/0248692 A1* 9/2015 Azevedo ............ G06Q 30/0222 705/14.36
2016/0171486 A1* 6/2016 Wagner .................. G06O 20/12 705/39

FOREIGN PATENT DOCUMENTS

| WO | WO2008/005018 | 1/2008 |
| WO | WO2009/114876 | 9/2009 |
| WO | WO2014/059327 | 4/2014 |

OTHER PUBLICATIONS

"Samsung Galaxy S5: How to Pay With Paypal 1-15 Fingerprint"; May 6, 2014; www.youtube.com/watch?v=tg4gRT3XB8c; 2 pg.
"Multi-Factor Biometrics: An Overview"; Jones Sipho-J Matse; Nov. 24, 2014; 13 pgs.
"Samsung Galaxy S5";Apr. 11, 2014; www.samsung.com/global/microsite/galaxys5/specs.html; 3 pgs.

* cited by examiner

SYSTEMS, METHODS, DEVICES, AND COMPUTER READABLE MEDIA FOR ENABLING DIRECT ELECTRONIC PAYMENT TRANSFERS

CROSS-REFERENCE TO RELATED APPLICATION

This application claims the benefit of, and priority to, European Patent Application No. 15166486.9 filed May 5, 2015. The entire disclosure of the above application is incorporated herein by reference.

FIELD

The present disclosure relates generally to electronic payment transactions. In particular, but not exclusively, this disclosure relates to methods, systems, devices, and computer readable media that enable direct electronic payment transfers between users of electronic devices, such as mobile devices, through use of such electronic devices.

BACKGROUND

This section provides background information related to the present disclosure which is not necessarily prior art.

Electronic payments became the widespread means for conducting payment transactions around the world. Many consumers have begun to utilize electronic wallets (also known as an e-wallet, a digital wallet, and a mobile wallet) for paying for their purchases at retail stores and online as a more secure and convenient way of conducting payment transactions. For example, an e-wallet can typically be used in a manner similar to a contactless payment card in "tap-to-pay" point of sale (POS) transactions with a customer tapping his or her electronic device (such as a cellular phone or mobile device) with an electronic wallet application installed thereon against a merchant's POS terminal to pay for goods or services he or she wishes to acquire.

An e-wallet can be thought of as a platform/system/service with three main components: (1) an electronic infrastructure, typically supported by an e-wallet service provider (e.g., a payment network provider such as MasterCard®, a mobile network operator—MNO, a financial provider, or the like), (2) an electronic device, which serves to replace a regular wallet with payment cards, cash, and/or a check book, and (3) an e-wallet software application installed on the electronic device to enable the user of the electronic device to use it as a payment device in payment transactions. Many e-wallet platforms store payment credentials of the user directly in the hardware of the electronic device, such as in a secure chip or a subscriber identification module (SIM) card. Once the user registers for the e-wallet service, along with his or her accounts such as credit cards, the user is able to use the electronic device to pay for his or her purchases at participating merchants.

Many different forms of electronic wallets are available to consumers. An e-wallet may, for example, be solely a software solution (e.g., PayPal®)) with the payment credentials being stored in the cloud and payments being processed using transmission protocols that could be executed by software-only solutions. Some e-wallet platforms, however, implement the software-hardware approach instead and store the payment credentials in the hardware of the electronic device, such as in a SIM card. In a typical "tap-to-pay" transaction, such an e-wallet application provides the payment credentials from the electronic device to the POS terminal using the near field communication (NFC) technology.

Further, some e-wallet platforms, (e.g., Google® wallet), in order to avoid dependence on SIM cards, and consequently MNOs, store the payment credentials in the cloud and utilize the hardware-based NFC technology for transmitting the payment credentials from the electronic device to the POS terminal. Another example of an e-wallet platform, Apple Pay™, embeds its e-wallet directly into the operating system of the electronic device and uses a secure, SIM-independent, memory chip for storing the payment credentials.

Typically, an e-wallet platform does not expose actual account numbers to merchants. To achieve this, aliases of actual accounts, such as tokens, are stored as the user's payment credentials by some e-wallet platforms. Furthermore, most of the e-wallet platforms incorporate additional authentication mechanisms (security features) for authenticating users conducting payment transactions. Such authentication mechanisms include a personal identification number (PIN), a fingerprint, a password, a pre-defined swiping gesture, and/or other security feature(s) and may be enforced by the e-wallet application in order to complete a payment transaction.

An e-wallet is a convenient and secure way to pay for goods and services. However, person-to-person, customer-to-business, business-to-customer, or business-to-business payment transfers typically follow a more traditional approach, such as a person (payer) going to a bank or logging-in online to set-up a transfer of funds to a desired party (payee). Such transfer set-ups often require detailed information from the payer about the payee and the payment transfers themselves may take several days to clear, particularly when made from the payer to the payee for the first time. This approach lacks mobility, fluidity, and convenience of the above-described e-wallet platforms, and is time-consuming and inefficient.

Accordingly, there is a need for methods and systems to enable payment transfers between payers and payees in a simple, direct manner that does not require special trips to a bank by the payer, or detailed information about the payee. There is a further need for methods and systems that enable payment transfers in a secure manner and without substantial delays in transfer of funds between the parties that are so common to bank transfers.

SUMMARY

This section provides a general summary of the disclosure, and is not a comprehensive disclosure of its full scope or all of its features. Aspects and embodiments of the disclosure are also set out in the accompanying claims.

Methods, systems, devices, and computer readable media for enabling electronic payment transfers between payers and payees are disclosed.

According to a first aspect, a computer-implemented method for requesting an electronic payment transfer from a payer is provided. The method comprises receiving, from a first application installed on an electronic device, identification information of a payer based on a user selection at the electronic device; receiving, via a second application installed on the electronic device, a user identification of a payment amount, wherein the second application is different from the first application; capturing, at a biometrics reader associated with the electronic device, biometric data of the user; comparing the captured biometric data to authorized biometric data to authenticate the user; and initiating from the electronic device, upon successful authentication of the user, a request for the electronic payment transfer from the payer to the user for the payment amount.

In this manner, the user of the electronic device is enabled to initiate a request for an electronic payment transfer from a payer, whom he or she can easily identify through application(s) already installed at the electronic device, in a simple and direct manner that does not require special trips by the user to a bank or detailed information about the payer. Such an electronic payment transfer advantageously can be initiated by the means of the electronic device, such as a smart mobile device, anywhere, at any time, for any amount, and in a secure manner.

In some example embodiments, the method further comprises invoking the second application in response to receiving the identification information of the payer from the first application.

In some example embodiments, the method further comprises accessing identification data of the first application from the second application to enable the user to select the payer.

In some example embodiments, invoking the second application on the electronic device comprises bringing the second application, running in the background of the electronic device, into the foreground.

In some example embodiments, invoking the second application comprises launching the second application.

In some example embodiments, the method further comprises receiving, at the electronic device, one or more alerts indicating a status of the electronic payment transfer.

In some example embodiments, the one or more alerts comprise one or more of an email, an SMS message, a social media message, a message received through the second application, an automated voicemail message, or any combination thereof.

In some example embodiments, the one or more alerts comprise at least one of a confirmation that the payer received the request for the electronic payment transfer, a confirmation that the payer initiated the electronic payment transfer, a confirmation that the electronic payment transfer is ready for acceptance, or a confirmation that the electronic payment transfer was deposited to an account of the user.

In some example embodiments, the method further comprises receiving, via the second application installed on the electronic device, a user selection of an account registered with the second application for accepting the electronic payment transfer.

In some example embodiments, the method further comprises: receiving a message indicating that the electronic payment transfer is ready for deposit; capturing, at the biometrics reader associated with the electronic device, second biometric data of the user; comparing the captured second biometric data to the authorized biometric data to authenticate the user; and initiating from the electronic device, upon successful authentication of the user, deposit of the electronic payment transfer into the selected account.

In some example embodiments, the method further comprises updating information on the selected account to reflect the deposit of the electronic payment transfer.

In some example embodiments, initiating the deposit of the electronic payment transfer comprises determining, to complete the electronic payment transfer, an amount for depositing into the selected account based on one or more of: the payment amount, a transfer fee associated with the electronic payment transfer, or a pre-defined limit associated with the electronic payment transfer.

In some example embodiments, initiating the deposit of the electronic payment transfer comprises initiating, automatically, a pre-defined donation transfer from the selected account in association with the deposit of the electronic payment transfer, wherein the pre-defined donation transfer is a separate transaction linked to the deposit of the electronic payment transfer, or a respective donation transfer amount is deducted from the electronic payment transfer prior to the deposit.

In some example embodiments, the first application is a social media, address book, or browser application.

In some example embodiments, the second application is an e-wallet application.

In some example embodiments, the identification information comprises one or more of an email address, a phone number, or a social media identification information.

In some example embodiments, the payer is a person.

In some example embodiments, the payer is a business entity.

In some example embodiments, the electronic payment transfer is in one of a digital currency, real currency, stocks, shares, or any combination thereof.

In some example embodiments, the biometric data of the user comprises one or more of: one or more fingerprints of the user, an image of a user's retina, an image of a user's face, an image of a user's iris, or an audio of user's voice.

In some example embodiments, the biometrics reader is incorporated within the electronic device.

In some example embodiments, the electronic device is a mobile device.

In some embodiments, the mobile device is cellular enabled, or Wi-Fi enabled, or both.

According to a second aspect, a computer-implemented method for initiating, from an electronic device, an electronic payment transfer to a payee is provided. The method comprises: receiving, at the electronic device, a request from the payee for the electronic payment transfer from a user of the electronic device to the payee; invoking an e-wallet application on the electronic device; receiving, via the e-wallet application, a user selection of an account registered with the e-wallet application; capturing, at a biometrics reader associated with the electronic device, biometric data of the user; comparing the captured biometric data to authorized biometric data to authenticate the user; and initiating from the electronic device, upon successful authentication of the user, the electronic payment transfer, designated for the payee, from the selected account.

In this manner, the user of the electronic device is enabled, at the electronic device, to receive and fulfil the electronic payment transfer request from the payee in a simple and direct manner that does not require special trips by the user to a bank or detailed information about the payee. Such an electronic payment transfer advantageously can be initiated by the means of the electronic device, such as a smart mobile device, anywhere, at any time, for any amount, including the requested amount, and in a secure manner.

In some example embodiments, invoking the e-wallet application on the electronic device comprises one of installing the e-wallet application on the electronic device, wherein the received request comprises a link for downloading the e-wallet application; launching the e-wallet application; or bringing the e-wallet application running in the background of the electronic device into the foreground.

In some example embodiments, the method further comprises determining a transfer amount for deducting from the selected account in association with the electronic payment transfer based on one or more of a requested payment amount identified by the received request, a user-identified payment amount received at the electronic device, a transfer fee associated with the electronic payment transfer, a pre-defined limit associated with electronic payment transfers from the selected account, or a donation amount pre-defined in association with transfers from the selected account.

In some example embodiments, the method further comprises updating information on the selected account to reflect the electronic payment transfer.

In some example embodiments the request for the electronic payment transfer is one of: an email, an SMS message, a social media message, a message received through the e-wallet application, or an automated voicemail message.

In some example embodiments, the electronic payment transfer is in one of a digital currency, real currency, stocks, shares, or any combination thereof.

In some example embodiments, the biometric data of the user comprises one or more of: one or more fingerprints of the user, an image of a user's retina, an image of a user's face, an image of a user's iris, and an audio of user's voice.

In some example embodiments, the biometrics reader is incorporated within the electronic device.

In some example embodiments, the electronic device is a mobile device.

In some embodiments, the mobile device is cellular enabled, or Wi-Fi enabled, or both.

According to a third aspect, a computer-implemented method for initiating an electronic payment transfer to a payee from an electronic device is provided. The method comprises: receiving, from a first application installed on the electronic device, identification information of the payee based on a user selection at the electronic device; receiving, via a second application installed on the electronic device, a user's selection of an account registered with the second application and a payment amount, wherein the second application is different from the first application; capturing, at a biometrics reader associated with the electronic device, biometric data of the user; comparing the captured biometric data to authorized biometric data to authenticate the user; and initiating from the electronic device, upon successful authentication of the user, the electronic payment transfer from the selected account, for the payment amount, and designated for the payee.

In this manner, the user of the electronic device is enabled to initiate an electronic payment transfer to a payee, whom he or she can easily identify through application(s) already installed at the electronic device, such as a social media or address book application, in a simple and direct manner that does not require special trips by the user to a bank or detailed information about the payee. Such an electronic payment transfer advantageously can be initiated by the means of the electronic device, such as a smart mobile device, anywhere, at any time, for any amount, and in a secure manner.

In some example embodiments, the method further comprises one of invoking the second application in response to receiving the identification information of the payee from the first application, or accessing identification data of the first application from the second application to enable the user to select the payee.

In some example embodiments, invoking the second application on the electronic device comprises one of bringing the second application, running in the background of the electronic device, into the foreground.

In some example embodiments, invoking the second application comprises launching the second application.

In some example embodiments, the method further comprises receiving, at the electronic device, an alert indicating a status of the electronic payment transfer.

In some example embodiments, the alert comprises one or more of: a confirmation that the electronic payment transfer was successfully initiated, a confirmation that the selected account was successfully updated to reflect the electronic payment transfer, a confirmation that the payee received and/or read a message about the incoming transfer, a confirmation that the electronic payment transfer was successfully received by the payee, or a confirmation that a pre-defined donation amount was deducted from the selected account in association with the electronic payment transfer.

In some example embodiments, the alert is one or more of: an email, an SMS message, a social media message, a message received through the second application, or an automated voicemail message.

In some example embodiments, initiating the electronic payment transfer comprises requesting processing of the electronic payment transfer, including sending of a message to the payee. The message comprises an indication that the electronic payment transfer was made.

In some example embodiments, the message further comprises instructions on retrieving the electronic payment transfer, including a link to download the second application.

In some example embodiments, the method further comprises updating information on the selected account within the second application to reflect the electronic payment transfer.

In some example embodiments, initiating the electronic payment transfer further comprises determining an amount for deducting from the selected account in association with the electronic payment transfer based on one or more of: a user's entry of a desired amount for transferring to the payee, a user's entry of a desired amount for deducting from the selected account, an additional fee associated with the electronic payment transfer, a user's selection of currency, or a pre-defined limit associated with the electronic payment transfer.

In some example embodiments, initiating the electronic payment transfer further comprises initiating, automatically, a pre-defined donation transfer from the selected account in association with the electronic payment transfer, wherein the pre-defined donation transfer is a separate transaction linked to the electronic payment transfer or a respective donation transfer that is included into the electronic payment transfer.

In some example embodiments, the first application is a social media, address book, or browser application.

In some example embodiments, the second application is an e-wallet application.

In some example embodiments, the identification information comprises one of an email address, a phone number, or social media identification information.

In some example embodiments, the payee is a person.

In some example embodiments, the payee is a business entity.

In some example embodiments, the electronic payment transfer is in one of a digital currency, real currency, stocks, shares, or a combination of thereof.

In some example embodiments, the biometric data of the user comprises one or more of: one or more fingerprints of the user, an image of a user's retina, an image of a user's face, an image of a user's iris, and an audio of user's voice.

According to a fourth aspect, a computer-implemented method for accepting, at an electronic device, an electronic payment transfer from a payer is provided. The method comprises receiving, at the electronic device, a message indicating an electronic payment transfer designated for a user of the electronic device; invoking an e-wallet application on the electronic device; receiving a user's selection of an account registered with the e-wallet application; capturing, at a biometrics reader of the electronic device, biometric data of the user; comparing the captured biometric data with authorized biometric data to authenticate the user; and initiating, upon successful authentication of the user, acceptance of the electronic payment transfer from the payer into the selected account.

In some example embodiments, the message is one of an email, an SMS message, a social media message, a message received through the e-wallet application, and an automated voicemail message.

In some example embodiments, the message comprises a link for downloading the e-wallet application and the method further comprises prompting the user to install the e-wallet application on the electronic device in order to receive the electronic payment transfer.

In some example embodiments, the method further comprises one or more of receiving, at the electronic device, a confirmation that the electronic payment transfer was deposited into the selected account, or causing a confirmation that the electronic payment transfer was accepted to be sent to the payer.

In some example embodiments, the electronic payment transfer is in one of a digital currency, real currency, stocks, shares, or any combination of thereof.

In some example embodiments, the biometric data of the user comprises one or more of: one or more fingerprints of the user, an image of a user's retina, an image of a user's face, an image of a user's iris, and an audio of user's voice.

According to a fifth aspect, an electronic device is provided. The electronic device comprises memory storing one or more applications and one or more processors configured to perform or execute any of the methods described above in respect of the first, second, third, and fourth aspects.

In some embodiments, the electronic device further comprises a biometrics reader configured to capture biometric data of a user of the electronic device.

In some example embodiments, the electronic device is stationary.

In some example embodiments, the electronic device is portable.

In some example embodiments, the portable device is a mobile device that is at least Wi-Fi enabled or cellular-enabled.

Accordingly to a sixth aspect a computer readable medium is provided. The medium stores instructions thereon which, when executed by at least one processor of a computer system or an electronic device cause the computer system or electronic device, respectively, to carry out any of the methods described above in respect of the first, second, third, and forth aspects.

Further areas of applicability will become apparent from the description provided herein. The description and specific examples and embodiments in this summary are intended for purposes of illustration only and are not intended to limit the scope of the present disclosure. In addition, the above and other features will be better understood with reference to the followings Figures which are provided to assist in an understanding of the present teaching.

DRAWINGS

The drawings described herein are for illustrative purposes only of selected embodiments and not all possible implementations, and are not intended to limit the scope of the present disclosure.

Implementations will now be described in detail, by way of example only, with reference to the accompanying drawings, in which.

Corresponding reference numerals generally indicate corresponding parts throughout the several views of the drawings.

DETAILED DESCRIPTION

Figure 1:
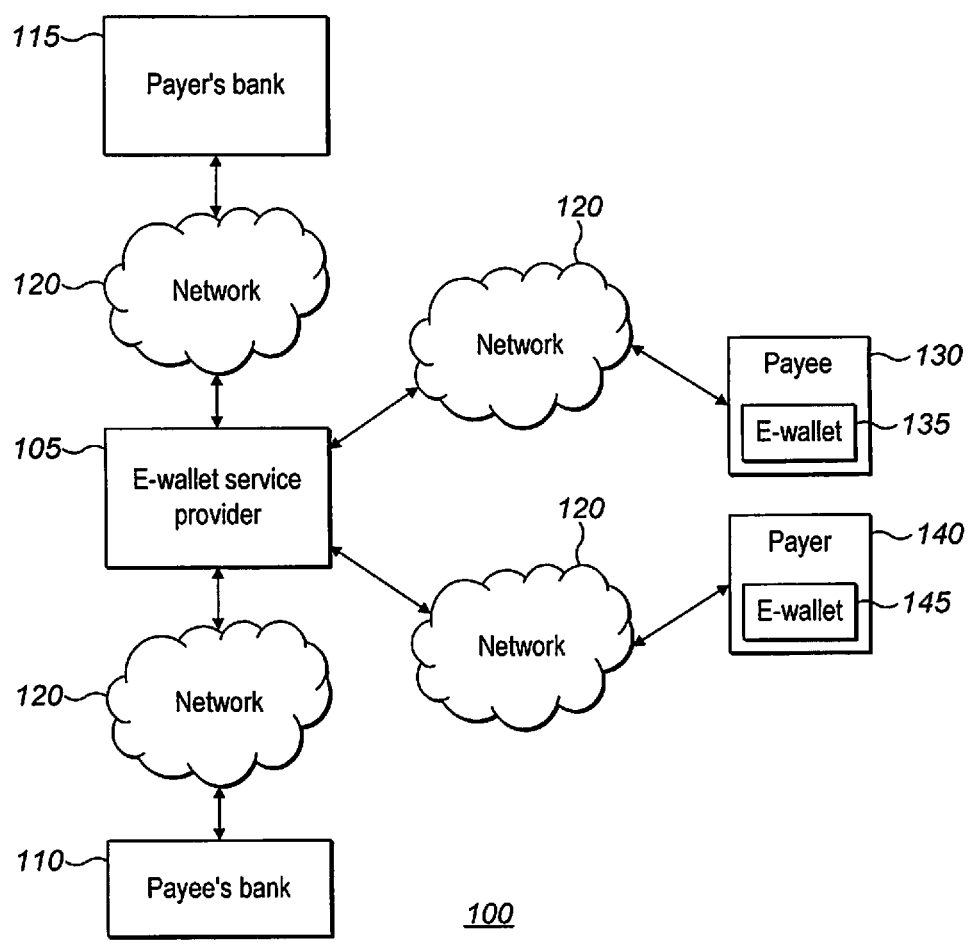
FIG. 1 depicts a system for enabling direct electronic payment transfers, in accordance with some embodiments of the disclosure.

Exemplary embodiments will now be described more fully with reference to the accompanying drawings. The description and specific examples included herein are intended for purposes of illustration only and are not intended to limit the scope of the present disclosure.

Embodiments of the present disclosure provide methods, systems, devices and computer readable media for enabling electronic payment transfers between payers and payees in a simple, direct manner that does not require special trips by a payer or a payee to a bank or detailed information about the payer or the payee. In particular, the disclosed methods, systems, devices, and computer readable media expand on the e-wallet platforms to enable person-to-person, customer-to-business, business-to-customer, and business-to-business electronic payment transfers. Such electronic payment transfers advantageously can be initiated using electronic devices, such as a smart mobile device, anywhere, at any time, for any amount, and in a secure manner. Further, the disclosed methods, systems, devices, and computer readable media, enable real-time (substantially instantaneous) access to the transferred funds by the payee. Moreover, the disclosed methods, systems, and computer readable media advantageously provide for a simple and fast electronic payment transfer platform that relies on a reduced number of entities, comparing to a more traditional model, to facilitate electronic payment transfers, thereby providing for a scalable solution with minimal dependency. The disclosed methods, systems, and computer readable media also provide for a platform that minimizes fraud and protects consumer data.

Embodiments of the present disclosure are described below primarily with reference to the MasterPass™ e-wallet and mobile devices. It should be appreciated, however, that this is an exemplary application of the disclosed embodiments, and they are in no way restricted to this application, as the context of the MasterPass™ e-wallet and mobile devices is merely illustrative. The described embodiments and the described techniques are more generally applicable to any forms and types of e-wallets and specially designed applications and can be implemented using various electronic devices, such as desktop computers, tablets, notebooks, and the like. Therefore, embodiments according to the disclosure are not limited by the specific embodiments depicted in the figures and, rather, are limited only by the scope of the claims that follow.

Generally, MasterPass™ is an e-wallet platform (digital service) provided and facilitated by the MasterCard® payment network. Users of the MasterPass™ e-wallet are enabled to securely store their accounts' information, shipping addresses, and other information in a secured environment supported by the trusted entity, (i.e., MasterCard®). The customer's accounts (debit, credit, checking, saving, investment, bitcoin, and others) are linked to a cell phone number of the customer and the MasterPass™ e-wallet.

The MasterPass™ e-wallet application is typically installed on the mobile device of the user, however, it can also be accessed by other means, such as through a designated website. The MasterPass™ e-wallet application enables the user of the mobile device on which it is installed to pay for goods and services at a store or online securely, using any payment cards linked to the MasterPass™ e-wallet. The MasterPass™ e-wallet eliminates the need for online shoppers to enter payment and shipping information with every purchase. At the same time, MasterPass™ e-wallet also supports the use of NFC and QR codes technology, thereby enabling its users to shop at the retail stores.

The MasterPass™ e-wallet is designed to provide for a single card transaction, and also supports multiple layers of security, including but not limited to: finger print authentication, reCaptcha at registration, password, multi-factor authentication login, site-to-user authentication (personal security message), pre-transactions SMS verification, and other security measures.

FIG. 1 depicts a system 100 for enabling direct electronic payment transfers, in accordance with some embodiments of the disclosure. The system 100 includes an e-wallet service provider 105, such as MasterCard® hosting the MasterCard® payment network, a payee's bank 110, a payer's bank 115, a payee 130, a payer 140, and one or more networks 120 enabling communications and transfer of data between the named parties.

In FIG. 1, both the payee 130 and payer 140 are mobile devices having e-wallet applications 135 and 145 respectively installed thereon. As described below in greater detail, the payer 140 can initiate an electronic payment transfer to the payee 130 using the e-wallet application 145. In turn, the payee 130 can receive such an electronic payment transfer through the e-wallet application 135.

In embodiments depicted in FIG. 1, the payer 140 first selects identification information of the payee through the e-wallet application, or another application installed on the mobile device and linked to the e-wallet application 135, such as an address book application. The payer 140 then selects one of his or her accounts registered with the e-wallet application, enters the payment amount, and then supplies his or her biometric data (e.g., scans a finger at a fingerprint reader of the payer's mobile device) to authenticate him or herself. If the authentication is successful, the electronic payment transfer is initiated with relevant data being transmitted through the network 120 to the e-wallet service provider 105.

The e-wallet service provider 105 forwards a respective message concerning the incoming electronic payment transfer to the payee 130. The payee 130 accepts the electronic payment transfer through the e-wallet application 135 by selecting an account registered with the e-wallet application 135 and confirming his or her identity with biometric data in the manner similar to the one discussed in relation to the payer 140. Once the payee 130 is authenticated, a respective message is sent to the e-wallet service provider who then clears and settles the electronic payment transfer between the payee 130 and the payer 140 and their respective banks 115 and 110. Further, data concerning the processed transfer is provided to the e-wallet applications 135 and 145 of the payee 130 and payer 140 respectively to reflect the transfer. Furthermore, the e-wallet service provider 105 is able to generate respective transfer status messages and provide them to the relevant parties.

As shown in FIG. 1, the e-wallet service provider 105 servers as a hub and intermediary for facilitating the electronic payment transfer's initiation, generation, and completion. For example, the e-wallet service provider 105 facilitates the exchange of data between the payer's e-wallet application 145 and the payer's bank 115 during the initiation stage to confirm availability and sufficiency of funds in the selected account for the requested payment transfer. The e-wallet service provider 105 also facilitates acceptance of the payment transfer by the payee 130 by confirming (authenticating) the account selected by the payee 130 and clearing and settling the transaction between the payer 140 and payee 130.

In some embodiments, however, some of the exchanges are conducted directly between the parties involved and do not include routing of data through the e-wallet service provider 105. For example, a message informing the payee 130 about the incoming transfer may be generated at the payer's mobile device and sent directly to the payee's mobile device via a cellular network. Further, the payer's bank 115 or the payee's bank 110, each, can communicate with the e-wallet applications 145 and 135 directly in respect of the initiation and acceptance of the payment transfer, where the e-wallet service provider 105 is primarily responsible for settling and clearing the transaction.

Although, as shown, the payee 130 has the e-wallet application 135 installed, it is not necessary for the payee 130 to have such an application installed at the time the payer 140 initiates the electronic payment transfer. Rather, if the payee 130 does not have the e-wallet application 135 installed, the payee 130 will be invited to install the e-wallet application 135 to receive the electronic payment transfer and is provided with respective instructions such as a link for downloading the e-wallet applications and/or set-up instructions.

Further, as discussed below in greater detail in respect of FIGS. 4 and 5, in some embodiments, the payee 130 can initiate a request for an electronic payment transfer from the payer 140 to the payee 130 for a desired payment amount using the e-wallet application 145. The request is then sent to the payer 140, who can fulfil the request using the e-wallet application 145.

Figure 2:
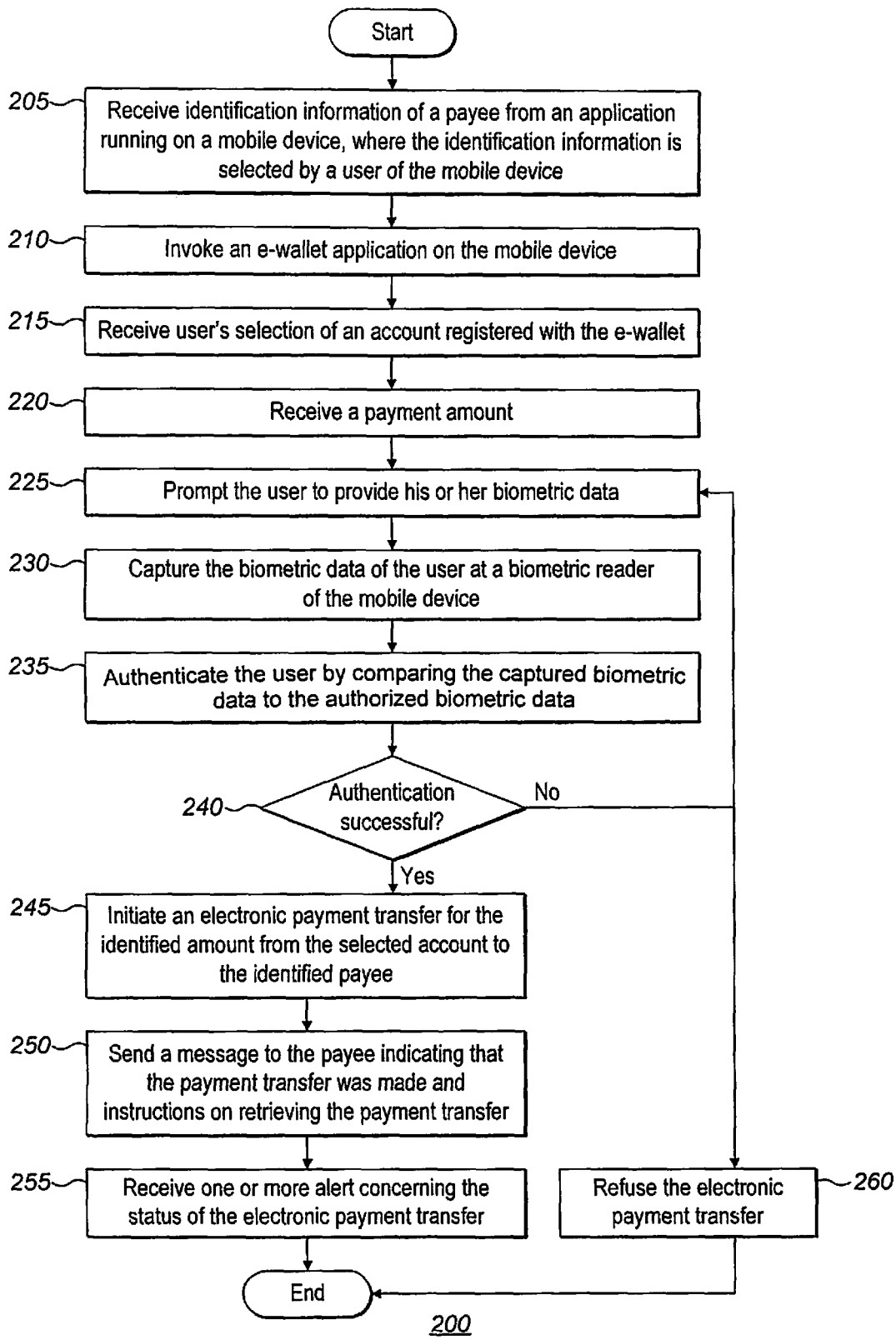
FIG. 2 depicts a flowchart of a method for initiating, from a mobile device, an electronic payment transfer to a payee, in accordance with some embodiments of the disclosure.

FIG. 2 depicts a flowchart of a method 200 for initiating, from a mobile device, an electronic payment transfer to a payee, in accordance with some embodiments of the disclosure. The method starts at step 205, at which identification information of a payee is received from one of the applications running on the mobile device. For example, the user of the mobile device (payer) may open an address book application and select one of the addressees, select a payee through social media (such as a Facebook™ friend, a LinkedIn® contact, a Twitter® account holder, or the like), browse a site, which happens to list contact information (such as a business site, a personal site, a donation page, or some other site listing contact information, such as a phone number or an email), or the like.

In some embodiments, a plug-in is installed on the mobile device, where the plug-in enables the user to select a payee and invoke an e-wallet application. For example, the plug-in may parse the information displayed on the mobile device screen to detect identification information, such as a phone number, an email address, a social media alias, or the like, and display an e-wallet icon next to such identification information. By selecting/pressing the icon, the user selects a payee identified by the identification information. Alternatively, or in addition, the user may be provided with an option to select the identification information to select the payee once the user has a cursor over the identification information.

At step 210, the e-wallet application (or a specially designed application) is invoked. If the e-wallet application is already running on the mobile device, at step 210, it is simply brought to the foreground to engage the user of the mobile device to select an account and enter a payment amount. If the e-wallet application is not yet running, it is then launched at step 210. The payee identification information is automatically transferred into the e-wallet application and associated with the future electronic payment transfer.

Typically, the user would have one or more accounts registered with the e-wallet application, such as credit card(s), debit card(s), checking account(s), saving account(s), prepaid account(s), and the like. At steps 210, 215 and 220, the user respectively selects one of the registered accounts and enters an amount to be transferred to the payee. In some embodiments, the e-wallet user interface includes a drop down menu for selecting the registered account and an entry field for entering the payment amount. The user interface may further include a dropdown menu for selecting a currency of the electronic payment transfer. If the user has not yet registered any accounts with the e-wallet application, he or she will be invited to so do, and subsequently, such an account will be selected to complete the transaction.

Once the user is satisfied with his or her selections, he or she requests generation of the electronic payment transfer, e.g., by selecting a 'CONFIRM TRANSFER' button. In response, the e-wallet application activates the biometrics reader of the mobile device and requests the user to submit his or her biometric data (step 225). Such biometric data may include one or more fingerprints of the user, an image of a user's retina, an image of a user's face, an image of a user's iris, and/or an audio of user's voice. Thus, at step 225, the user may be requested to place one or more fingers, simultaneously or sequentially, against a fingerprint scanner embedded in the mobile device, use the mobile device to scan his or her retina or iris, take a picture of his/her face, and/or say a key phrase, which are then captured at step 230. In some embodiments, the e-wallet application can be configured to request two or more different types of the biometric data and/or additional security data, such as a password.

At step 235, the captured biometric data is compared to the authorized biometric data, typically stored securely in the mobile device, to authenticate the user. The authorized biometric data may be saved, for example, at the time of the initial set-up of the e-wallet application or provided by the service provider. If the captured and authorized biometric data does not match, the user may be prompted to re-submit his or her biometric data, thus returning (at step 240) the method to step 225. In some embodiments, the user is allowed only a pre-determined number of unsuccessful attempts to submit his or her biometric data. Once all attempts are used up, the requested electronic payment transfer is refused (step 260). Further, in some embodiments, the user is also locked out of the e-wallet application when the pre-defined number of unsuccessful attempts has been reached.

If the captured and authorized biometric data matches, a respective electronic payment transfer is initiated from the account selected by the user to the identified payee for the entered payment amount (step 245). The initiation of the electronic payment transfer includes transmitting data concerning the electronic payment transfer from the mobile device to the respective service provider, such as MasterCard®, who processes the electronic payment transfer. The payment amount is deducted from the selected account, and respective data within the e-wallet is updated accordingly.

In some embodiments, fees associated with the electronic payment transfer apply at the time of the transfer, such as fees for using a particular account for the transfer, transfer fee(s), overdraft fee(s), currency exchange fee(s), or some other additional fees. Further, a day limit and/or a single-transfer limit may be enforced by the e-wallet application. In such embodiments, the amount that will be deducted from the selected account in association with the electronic payment transfer and the amount that will actually be sent to the payee will differ.

The e-wallet application may be configured to enable the payer to enter, at step 215, the amount that he or she wishes to be deducted from the account, instead of the amount that he or she wishes the payee to receive, or otherwise allocate responsibilities for any of the associated fees between the payee and payer. In the scenario where the payer enters the amount that he or she wishes the payee to receive, the payer becomes responsible for all associated fees and such fees are added to the payment amount to determine the amount that will be deducted from the selected account. In the scenario, where the payer enters the payment amount that he or she wishes to be deducted from the account, the payee bears the cost of all associated fees, and thus may receive a lower amount than the one that was entered by the payer.

Therefore, the electronic payment transfer initiation process may require determining an amount that will be deducted from the selected account in association with the electronic payment transfer. Such determination may be based on the payer's entry of the amount that he or she desires to be transferred to the payee, the payer's entry of the amount that he or she desires to be deducted from the selected account, transfer fee(s) associated with the electronic payment transfer, currency of the transaction and whether an exchange is required, pre-set (pre-defined) limits (transaction, per-day, or the like) associated with the electronic payment transfers and/or e-wallet application, and/or other associated fees.

In some embodiments, the user is enabled to subscribe to an automatic donation service in association with the e-wallet application. For example, the user may set-up for an automatic donation for a pre-defined amount to a designated charity to be made every time the user makes and/or accepts a payment using the e-wallet application. If the user is subscribed to such a service, the initiation of the electronic payment transfer further includes initiating an automatic donation transfer to the designated charity for the pre-defined amount in association with the electronic payment transfer. Depending on the user's preferences, the automatic donation transfer can be made from the account used to make the electronic payment transfer to the payee or from a different, pre-defined account registered with the e-wallet application. The donation transfer may be conducted as a separate transaction associated with the electronic payment transfer or incorporated within the electronic payment transfer. Further, donation transfers may be completed every time the user makes and/or receives a qualified payment transfer or aggregated over a period of time or number of transfers. Also, the donation transfers may be capped at a certain amount over a pre-defined period of time At step 250, a message indicating that the electronic payment transfer was made and instructions on retrieving the electronic payment transfer are sent to the payee. Such a message can be sent from the mobile device directly or by the service provider on behalf of the payer (the user of the mobile device) once the electronic payment transfer has been initiated. The message can be in the form of an email, an SMS message, a social media message, a message sent through the e-wallet application, if the payee has the e-wallet application installed, an automated voicemail message and/or by some other means. The message may include a link for downloading the e-wallet application. In some embodiments, such a link is included only when the payee is not registered for the e-wallet service, at least under the identification information selected by the payer, while in some other embodiments, the link is included regardless of whether the payee is registered or has the e-wallet installed on his or her mobile device. In some embodiments, several messages can be sent, using the same or different types of messages.

At step 255, the payer receives one or more alerts concerning the status of the electronic payment transfer. Such alerts may be separated in time and include one or more of a confirmation that the electronic payment transfer was successfully initiated, a confirmation that the payment amount was successfully deducted from the selected account, a confirmation that the payee received and/or read the message about the incoming transfer, a confirmation that the electronic payment transfer was successfully received by the payee, or a confirmation that the pre-defined donation amount was deducted from the selected or pre-defined account in association with the electronic payment transfer.

As described, in FIG. 2, the e-wallet application is invoked in response to the user selecting the payee through a different application, such as a social media application, a browser, or an address book application. However, in some embodiments, the user is also (or instead) enabled to start the electronic payment transfer process with the e-wallet application, from which he or she is provided with access to the identification information of selectable payees from the other application(s). More specifically, the e-wallet application is linked to such other application(s) installed at the mobile device and the e-wallet application is allowed access to (receive) the contact/identification information from such applications. The e-wallet application in turn enables the user to access contact information (e-mail addresses, phone numbers, social media aliases, and the like) from such applications either within the e-wallet application, for example, through a drop down menu within the e-wallet application, or by invoking one of such applications in response to the user's request to select the payee. In the latter scenario, once the user selects the payee, he or she is returned into the e-wallet application to continue with the setting-up of the electronic payment transfer request. Therefore, the user is enabled to select a particular payee/payer, whose contact information is included in one of such applications, through the e-wallet application.

Further, the order in which the user selects data necessary to set-up the electronic payment transfer is not necessarily fixed and may differ between different embodiments, depending on the user's preferences, and/or on the order in which the user decides to proceed during a particular session with the e-wallet application. Further, in some embodiments, the user is allowed to modify details of the electronic payment transfer after he or she has been authenticated based on the submitted biometric data but before the transfer was initiated. For example, the e-wallet user interface may include a 'SUBMIT' button for finalising the electronic payment transfer after the successful authentication and a 'MODIFY' button, which is selectable at any time until the 'SUBMIT' button was clicked, engaged, or otherwise selected. Depending on, for example, specific settings of the e-wallet application, the user may be required to re-submit his or her biometric data to complete the process after the modifications have been completed, or not, if for example all actions are performed during a single session, e.g., defined by a pre-determined time limit.

Figure 3:
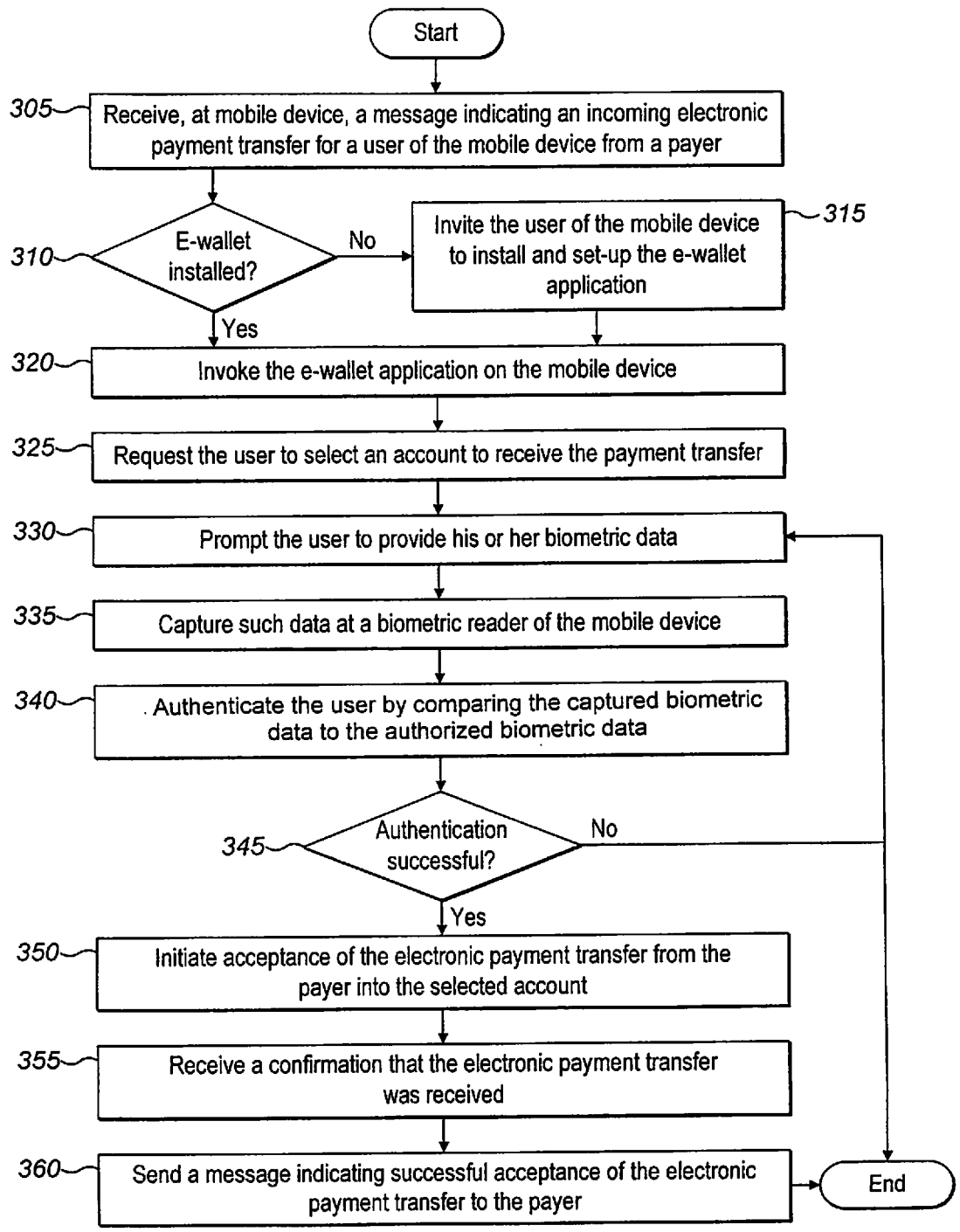
FIG. 3 depicts a flowchart of a method for accepting, at a mobile device, an electronic payment transfer from a payer, in accordance with some embodiments of the disclosure.

FIG. 3 depicts a flowchart of a method 300 for accepting, at a mobile device, an electronic payment transfer from a payer, such as an electronic payment transfer initiated in accordance with the method 200 described in respect of FIG. 2, in accordance with some embodiments of the disclosure. The method 300 starts with a user of the mobile device receiving a message (alert, or the like) indicating an incoming electronic payment transfer from the payer (step 305). The message can be in the form of an email, an SMS message, a social media message, a message received through an e-wallet application, if the e-wallet application is already installed on the mobile device (at 310), an automated voicemail message, and/or in some other form. If the mobile device does not have the e-wallet application installed thereon (at 310), the message includes a link for downloading the e-wallet application. In some embodiments, the link for downloading the e-wallet application is included in the message regardless of whether the e-wallet application is already installed on the mobile device.

If the e-wallet application is not installed, the user is invited to download and install the e-wallet in order to receive the electronic payment transfer (at 315). By clicking on the link, the user is taken directly to the e-wallet application install page in an application store. Once the e-wallet application has been downloaded, the user is requested to register at least one account with the e-wallet application and set-up his or her preferences, such as modes of authentication, link the e-wallet to social media application(s), types of incoming communications (alerts, messages), and/or the like.

At step 320, the e-wallet application is invoked on the mobile device. More specifically, if the e-wallet application is already running on the mobile device, then, at step 320, it is simply brought to the foreground to engage the user of the mobile device to receive the incoming payment transfer. If the e-wallet application is not yet running, it is then launched at step 320.

At step 325, the user is requested to select one of the account(s) registered with the e-wallet application, for example, using a drop down menu, for receiving the incoming transfer. Once the user selects the account, the e-wallet application activates a biometrics reader of the mobile device and prompts the user to provide his or her biometric data for authentication (step 330). Such biometric data may include one or more fingerprints of the user, an image of a user's retina, an image of a user's face, an image of a user's iris, and/or an audio of user's voice. Thus, at step 330, the user may be requested to place one or more fingers, simultaneously or sequentially, against a fingerprint scanner embedded in the mobile device, use the mobile device to scan his or her retina or iris, take a picture of his/her face, say a key phrase, which are then captured at step 335.

At step 340, the captured biometric data is compared to the authorized biometric data, typically stored securely at the mobile device, to authenticate the user. If the captured and authorized biometric data does not match (at 345), the user may be prompted to re-submit his or her biometric data, thus returning the method to step 330. In some embodiments, the user is allowed only a pre-determined number of unsuccessful attempts to submit his or her biometric data. Once all attempts are used up, the requested electronic payment transfer is refused. Further, in some embodiments, the user is also locked out of the e-wallet application when the pre-defined number of unsuccessful attempts has been reached.

If the captured and authorized biometric data matches (at step 345), a respective acceptance of the electronic payment transfer from the payer into the selected account is initiated (step 350). The initiation process includes transmitting data concerning the account for receiving the electronic payment transfer from the mobile device to the respective service provider such as MasterCard®, who completes the electronic payment transfer. The transfer amount is deposited into the selected account, and respective data within the e-wallet is updated accordingly. Such a transfer is substantially instantaneous and does not require the payee to wait for several days for the transaction to clear.

In some embodiments, the user is enabled to subscribe to an automatic donation service within or in association with the e-wallet application. For example, the user may select to make an automatic donation for a pre-defined amount to a designated charity every time the user makes or receives a payment using the e-wallet application. Thus, if the user is subscribed to such a service, the acceptance of the electronic payment transfer further includes initiating an automatic donation transfer to the designated charity for the pre-defined amount in association with the acceptance of the electronic payment transfer. Depending on the set preferences, the automatic donation transfer can be made from the account in which the electronic payment transfer is being deposited or from a different, pre-defined account registered with the e-wallet, or subtracted from the transfer amount prior to being deposited or aggregated with other automatic donation transfers over a period of time.

At step 355, the user is alerted that the electronic payment was successfully deposited into the selected account. In particular, a message can be sent by the service provider to the user (payee) once the money has been deposited. The message can be in the form of an email, an SMS message, a social media message, a message provided through the e-wallet application, an automated voicemail message and/or by some other means and may depend, for example, on the preferences of the payee. In some embodiments, simply a balance of the selected account is updated once the transfer has been completed and no designated message is sent to the payee.

At step 360, a message indicating that the electronic payment transfer was successfully received is sent to the payer. Such a message can be sent from the mobile device of the payee directly or by the service provider on behalf of the payee once the acceptance of the electronic payment transfer has been initiated. The message can be in the form of an email, an SMS message, a social media message, a message sent through the e-wallet application, if the payee has the e-wallet application installed, an automated voicemail message and/or by some other means and may depend, for example, on the preferences of the payee.

Figure 4:
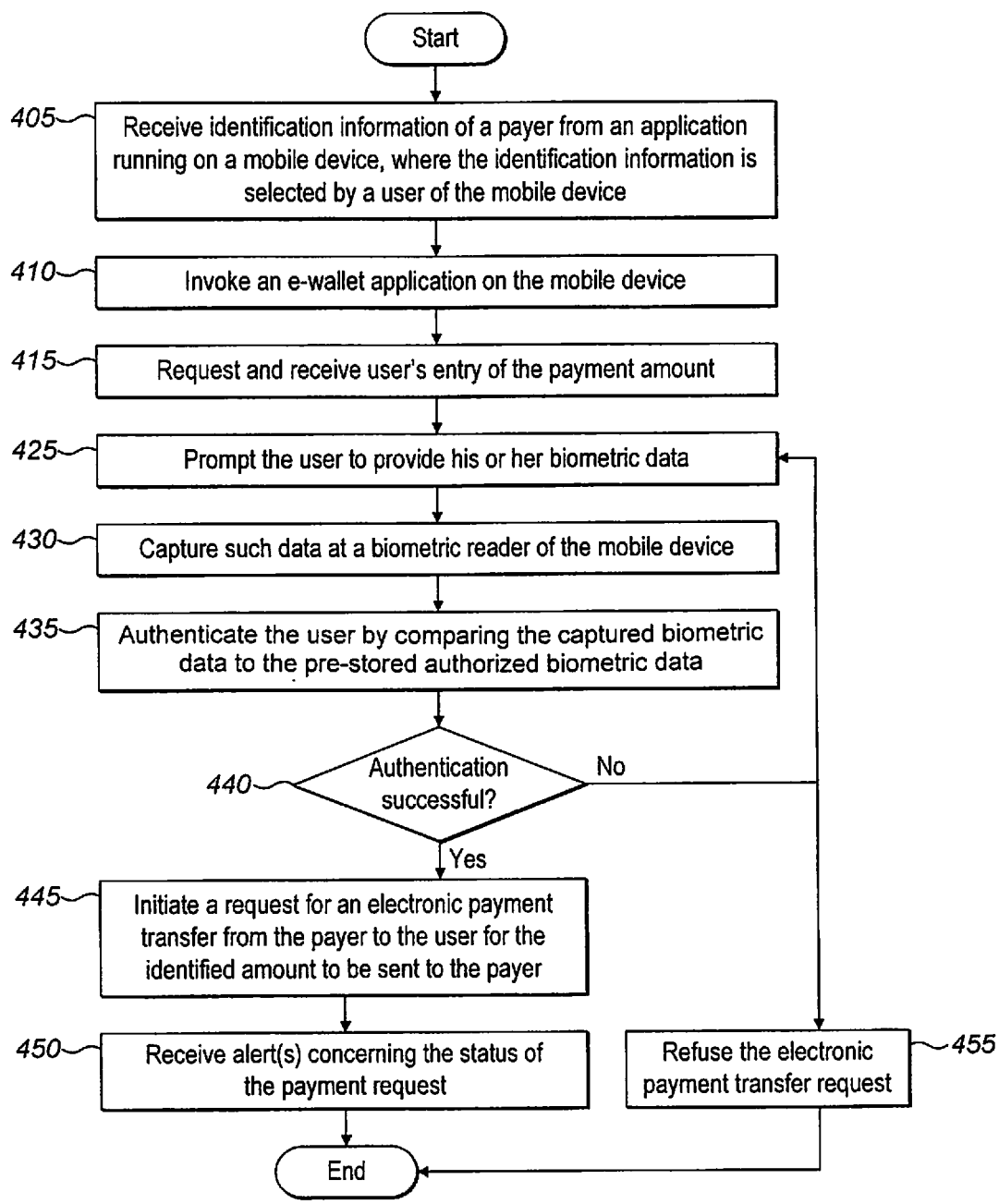
FIG. 4 depicts a flowchart of a method for requesting, from a mobile device, an electronic payment transfer to the user of the mobile device from a payer, in accordance with some embodiments of the disclosure.

FIG. 4 depicts a flowchart of a method 400 for requesting, from a mobile device, an electronic payment transfer to the user of the mobile device from a payer, in accordance with some embodiments of the disclosure. The method starts at step 405, at which identification information of a payer is received from one of the applications running on the mobile device. For example, the user of the mobile device may open an address book application and select one of the addressees, select a payer through social media (such as a Facebook™ friend, a LinkedIn® contact, a Twitter® account holder, or the like), browse a site, which happens to list contact information (such as a business site, a personal site, a donation page, or some other site listing some contact information such as a phone number or an email), or the like.

In some embodiments, a plug-in, such as the plug-in discussed above in respect of FIG. 2 is installed on the mobile device, where the plug-in enables the user to select the payer and invoke an e-wallet application on the mobile device to generate an electronic payment transfer request from the payee.

At step 410, the e-wallet application (or a specially designed application) is invoked. More specifically, if the e-wallet application is already running on the mobile device, it is simply brought to the foreground to engage the user of the mobile device to enter a payment amount and initiate the electronic payment transfer request. If the e-wallet application is not yet running, it is then launched at step 410. The payer identification information is automatically transferred into the e-wallet application and associated with the electronic payment transfer request.

At step 415, the user is prompted to enter a desired payment amount, for example, in a specially designed entry field. The e-wallet user interface may further include a drop down menu for selecting a currency of the electronic payment transfer. In some embodiments, the user is enabled to enter 'unspecified' amount, or no amount at all, for example, when the user solicits from the payer a donation for a cause.

Once the user finalizes his electronic payment transfer request, e.g., by selecting a 'REQUEST TRANSFER' button, the e-wallet application activates the biometrics reader of the mobile device and requests the user to submit his or her biometric data (step 425). Such biometric data may include one or more fingerprints of the user, an image of a user's retina, an image of a user's face, an image of a user's iris, and/or an audio of user's voice. Thus, at step 425, the user may be requested to place one or more fingers, simultaneously or sequentially, against a fingerprint scanner embedded in the mobile device, use the mobile device to scan his or her retina or iris, take a picture of his/her face, say a key phrase, which are then captured at step 430. In some embodiments, the e-wallet application can be configured to request two or more different types of the biometric data and/or additional security data, such as a password.

At step 435, the captured biometric data is compared to the authorized biometric data, typically stored securely at the mobile device, to authenticate the user. If the captured and authorized biometric data does not match (at 440), the user may be prompted to re-submit his or her biometric data, thus returning the method to step 425. In some embodiments, the user is allowed only a pre-determined number of unsuccessful attempts to submit his or her biometric data. Once all attempts are used up, the electronic payment transfer request is refused (step 455). Further, in some embodiments, the user is also locked out of the e-wallet application when the pre-defined number of unsuccessful attempts has been reached.

If the captured and authorized biometric data matches (at 440), a respective request for the electronic payment transfer for the entered payment amount is initiated (step 445). In some embodiments, the electronic payment transfer request is generated at the mobile device, which sends it to the payer. In some other embodiments, the information concerning the request is transmitted from the e-wallet application to the respective service provider, such as MasterCard®, who arranges for the electronic payment transfer request to be generated and sent to the payer.

The electronic payment transfer request is sent to the payer as a message. If the payer is not registered for the e-wallet service or does not have the e-wallet application installed, the message may include a link for downloading the e-wallet application. In some embodiments, the link is included regardless of whether the payer has the e-wallet application. The message can be in the form of an email, an SMS message, a social media message, a message sent through the e-wallet application, if the payee has the e-wallet application installed, an automated voicemail message and/or by some other message. In some embodiments, several messages can be sent to the payer, using the same or different types of messages.

At step 450, the payee receives one or more alerts concerning the status of the electronic payment transfer. Such alerts may be separated in time and include one or more of a confirmation that the electronic payment transfer request was received and/or read, the electronic payment transfer was initiated by the payer, or an alert indicating the incoming electronic payment transfer responsive to the user's request. Similar to the message sent to the payer, these alerts can be in the form of an email, an SMS message, a social media message, a message provided via the e-wallet application, if the payee has the e-wallet application installed, an automated voicemail message and/or by some other message. Once the user receives the alert indicating the incoming electronic payment transfer responsive to the user's request, the user is able to accept the incoming transfer, for example, in the manner described in respect of FIG. 3.

As described, in FIG. 4, the e-wallet application is invoked in response to the user selecting the payer through a different application, such as a social media application, a browser, or an address book application. However, in some embodiments, the user is also (or instead) enabled to start with the e-wallet application, from which he or she is provided with access to the identification information of selectable payers from the other application(s). More specifically, the e-wallet application is linked to such other application(s) installed at the mobile device and allows the user to access contact information (e-mail addresses, phone numbers, social media aliases, and the like) from such applications either within the e-wallet application, for example through a drop down menu within the e-wallet application, or by invoking one of such applications in response to the user's request to select the payer. In the latter scenario, once the user selects the payer, he or she is returned into the e-wallet application to continue with the generation of the electronic payment transfer request.

Further, the order in which the user selects data necessary to generate the electronic payment transfer request is not necessarily fixed and may differ between different embodiments, depending on the user's preferences, and/or on the order in which the user decides to proceed during a particular session with the e-wallet application. Further, in some embodiments, the user is allowed to modify his or her electronic payment transfer request after he or she has been authenticated based on the submitted biometric data. For example, the e-wallet user interface may include a 'SUBMIT' button for finalizing the electronic payment transfer request after the successful authentication and a 'MODIFY' button, which is selectable at any time until the 'SUBMIT' button was clicked, engaged, or otherwise selected. Depending on, for example, specific settings of the e-wallet application, the user may be required to re-submit his or her biometric data to complete the request after the modifications have been completed, or not, if, for example, all actions are performed during a single session, e.g., defined by a pre-determined time limit.

Figure 5:
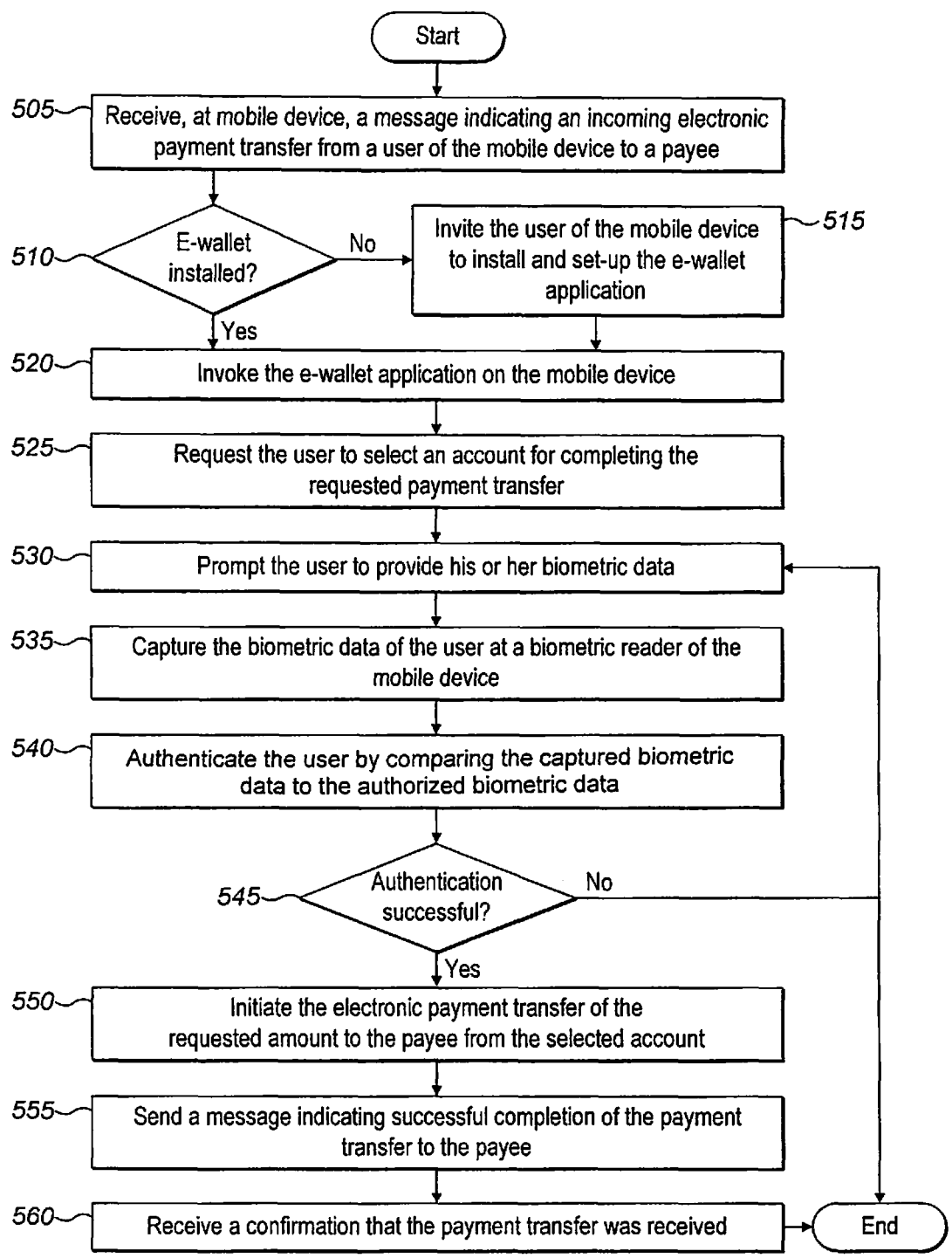
FIG. 5 depicts a flowchart of a method for initiating, from a mobile device, an electronic payment transfer to a payee responsive to an electronic request from the payee, in accordance with some embodiments of the disclosure.

FIG. 5 depicts a flowchart of a method 500 for initiating, from a mobile device, an electronic payment transfer to a payee responsive to an electronic payment transfer request from the payee, such as an electronic payment transfer request initiated in accordance with the method 400 described in respect of FIG. 4, in accordance with some embodiments of the disclosure. The method 500 starts with a user of the mobile device receiving a request from a payee for an electronic payment transfer from a user of the mobile device (step 505). The request can be in the form of an email, an SMS message, a social media message, a request received through an e-wallet application, if the e-wallet application is already installed on the mobile device (at 510), an automated voicemail message, and/or some other form of the request. The request may include a link for downloading the e-wallet application, for example, if the mobile device does not have the e-wallet application installed thereon. In some embodiments, the link for downloading the e-wallet application is included in the message regardless of whether the e-wallet application is already installed on the mobile device.

If the e-wallet application is not installed (at 510), the user is invited (step 515) to download and install the e-wallet application in order to respond to the electronic payment transfer request. By clicking on the link, the user is taken directly to the e-wallet application install page in an application store. Once the e-wallet application has been downloaded, the user is requested to register at least one account with the e-wallet application and set-up his or her preferences, such as modes of authentication, link the e-wallet to social media application(s), types of incoming communications (alerts, messages), authorized biometric data, and/or the like At step 520, the e-wallet application is invoked on the mobile device. More specifically, if the e-wallet application is already running on the mobile device, then, it is simply brought to the foreground to engage the user of the mobile device to set-up the electronic payment transfer. If the e-wallet application is not yet running, it is then launched at step 520.

At step 525, the user is requested to select one of the account(s) registered with the e-wallet application, for example, using a drop down menu, for setting-up the requested electronic payment transfer. In some embodiments, the desired payment amount is included within the request and, as such, is pre-filled automatically. However, the user of the mobile device is enabled to overwrite such a payment amount with a different amount. Additionally, the user may need to enter a specific payment amount if the electronic payment transfer request is for the 'unspecified' payment amount. In some embodiments, the user of the mobile device is required to enter the payment amount regardless.

At step 530, the e-wallet application activates a biometrics reader of the mobile device and prompts the user to provide his or her biometric data for authentication. As discussed above, such biometric data may include one or more fingerprints of the user, an image of a user's retina, an image of a user's face, an image of a user's iris, and/or an audio of user's voice. Thus, at step 530, the user may be requested to place one or more fingers, simultaneously or sequentially, against a fingerprint scanner embedded in the mobile device, use the mobile device to scan his or her retina or iris, take a picture of his/her face, say a key phrase, which are then captured at step 535. More than one type of the biometric data may be requested at step 530.

At step 540, the captured biometric data is compared to the authorized biometric data, typically stored securely at the mobile device, to authenticate the user. If the captured and authorized biometric data does not match (545), the user may be prompted to re-submit his or her biometric data, thus returning the method to step 530. In some embodiments, the user is allowed only a pre-determined number of unsuccessful attempts to submit his or her biometric data. Once all attempts are used up, the requested electronic payment transfer is refused.

Further, in some embodiments, the user is also locked out of the e-wallet application when the pre-defined number of unsuccessful attempts has been reached.

If the captured and authorized biometric data does match (step 545), for example, with a predefined degree, a respective electronic payment transfer is initiated from the account selected by the user to the payee, who has requested the transfer for the requested payment amount (step 550). The initiation of the electronic payment transfer includes transmitting data concerning the electronic payment transfer from the mobile device to the respective service provider such as MasterCard®, who processes the electronic payment transfer. The payment amount is deducted from the selected account, and respective data within the e-wallet is updated accordingly.

In some embodiments, the user is enabled to subscribe to an automatic donation service within the e-wallet application. For example, the user may select to make an automatic donation for a pre-defined amount to a designated charity every time the user makes or receives a payment using the e-wallet application. Thus, if the user is subscribed to such a service, the initiation of the electronic payment transfer further includes initiating an automatic donation transfer to the designated charity for the pre-defined amount in association with the electronic payment transfer. Depending on the set preferences, the automatic donation transfer can be made from the same account as the electronic payment transfer or from a different, pre-defined account registered with the e-wallet.

At step 555, a message indicating that the electronic payment transfer was made in response to the payer's request is sent to the payee. Such a message can be sent from the mobile device directly or by the service provider on behalf of the payer once the electronic payment transfer has been initiated. The message can be in the form of an email, an SMS message, a social media message, a message provided via the e-wallet application, an automated voice-mail message and/or by some other means. In some embodiments, several messages can be sent, using the same or different types of messages.

At step 560, the payer receives one or more alerts concerning the status of the electronic payment transfer. Such alerts may be separated in time and include one or more of a confirmation that the electronic payment transfer was successfully initiated, a confirmation that the payment amount was successfully deducted from the selected account, a confirmation that the payee received and/or read a message about the incoming transfer, a confirmation that the electronic payment transfer was successfully received by the payee, or a confirmation that a pre-defined donation amount was deducted from the selected or pre-defined account in association with the electronic payment transfer.

Figure 6:
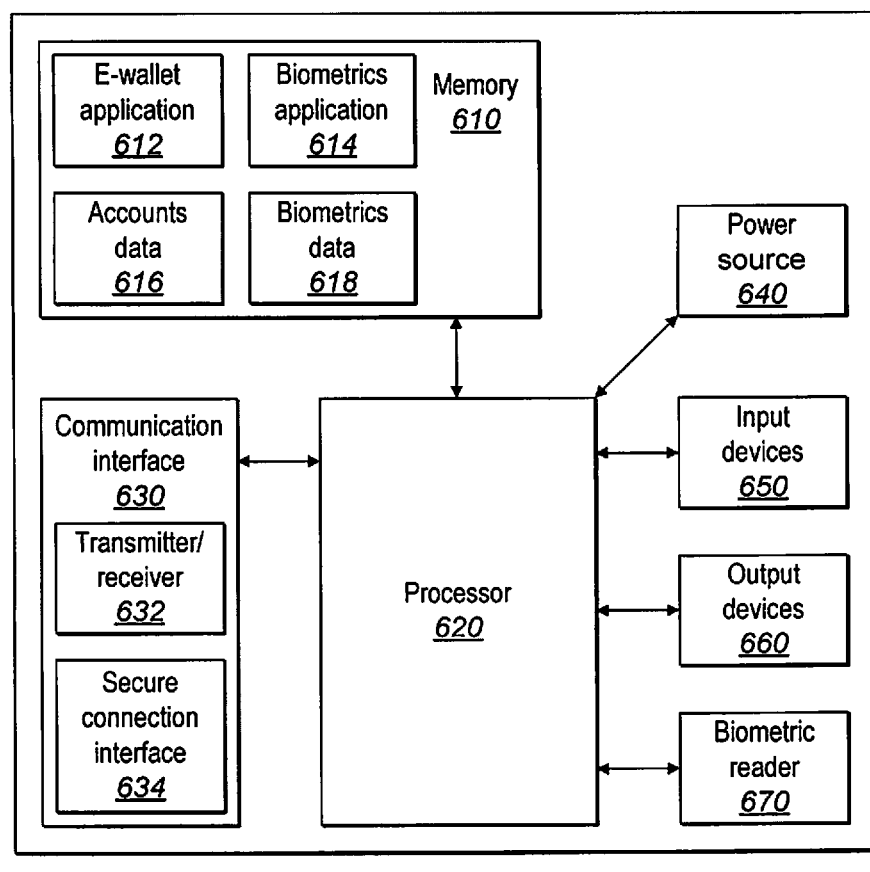
FIG. 6 depicts a diagram of a mobile device suitable to host an e-wallet application with expanded functionality, in accordance with some embodiments of the disclosure.

FIG. 6 depicts a mobile device 600 suitable to host and support an e-wallet application with the expanded functionality, described herein in respect of FIGS. 1 to 5 and 7, and facilitate direct electronic payment transfers though use of such a mobile device, in accordance with some embodiment of the disclosure. The mobile device 600 may, for example, be a cellular communication device, such as a mobile phone or a smart phone, or a mobile device with a wireless and/or wired access, such as a tablet, a laptop or a personal digital assistant, and/or the like.

The mobile device 600 generally includes one or more processors 620 operatively coupled to memory 610, a communication interface 630, a power source 640, input devices 650 (such as a keyboard, a touch screen, a microphone, and/or the like), and output devices 660 (such as a screen, a speaker, and/or the like), and a biometrics reader 670. The processor 620 includes circuitry that implements communication and logic functions of the mobile device 600, such as a digital signal processor device, a microprocessor device, various analog to digital and/or digital to analog converters, and/or other support circuits for operating the components of the mobile device 600.

The memory 610 includes any computer readable non-transitory medium or the like configured to store data, code, and/or other information. For example, the memory 610 may include volatile memory, non-volatile memory, magnetic and optical storage devices such as disk drives, magnetic tape, CDs (compact discs), DVDs (digital versatile discs), or other non-transitory media that are capable of storing code and/or data. The memory 610 can be embedded and/or may be removable. The non-volatile memory may additionally, or alternatively, include an electrically erasable programmable read-only memory, flash memory, and/or the like.

The memory 610 is configured to store any of a number of applications or programs for operating the mobile device 600. The application and/or programs generally comprise computer-executable instructions/code, which when executed (operated, or the like) by the processor 620 implement the functions of the mobile device 600 described herein. For example, as shown, the memory 610 may include an e-wallet application 612 and a biometrics application 614.

The e-wallet application 612 and biometrics application 614 can be pre-installed on the mobile device 600, for example, by a manufacturer or distributor of the mobile device 600, or installed by the user of the mobile device 600, for example, by downloading them directly to the mobile device 600. Although shown as separate applications, in some embodiments, the biometrics application 614 is integrated within the e-wallet application 612.

The e-wallet application 612, as well as any other application(s) stored in the memory 610, provides a graphical user interface (GUI) on a display of the mobile device 600. For example, the GUI for the e-wallet application 612 enables the user of the mobile device 600 to transfer funds from any of the accounts linked to the MasterPass™ to a payee designated by a phone number, email or the like, request a payment to from a payer designated by a phone number, email or the like, and subsequently deposit the payment (funds) into any of the accounts linked to the MasterPass™, and perform other actions described herein.

The memory 610 may also store data and other information used by the mobile device 600 and its components to implement the functions of the mobile device 600 and/or the other systems described herein. For example, the memory 610 may include accounts data 616 about user's accounts linked to the e-wallet, such as payment credentials and banking data, authorized biometric data 618 of the authorized user(s), user's profile information, including user's preferences and favourites, prior payment transfer history, and/or the like.

The biometrics reader 670 is configured to capture biometric data of the user of the mobile device. For example, the biometrics reader 670 may include a fingerprint scanner for scanning one or more user's fingerprints. In this example, when the user places a finger on the mobile device 600 against the biometrics reader 670, or against the mobile device's screen, the biometrics reader 670 captures an image of the user's fingerprint(s). The biometrics reader 670 may alternatively, or additionally, include a microphone for capturing the user's voice, a camera for capturing the user's face or iris, and/or some other device for detecting verifiable biometric data of the user.

The biometrics application 614 is configured to manage the biometrics reader 670, and in particular, to compare biometric data of the user captured by the biometrics reader 670 to the authorized biometric data 618, previously saved in the mobile device 600, and to communicate the result to the e-wallet application 612. For example, if the user of the device initiates an electronic payment transfer using the e-wallet application 612 or receives an electronic payment transfer, the e-wallet application 612 launches (invokes, or otherwise accesses) the biometric application 614 so as to capture biometric data of the user of the device, and then to compare the captured biometric data with the authorized biometric data 618. The biometrics application 614 employs the biometrics reader 670 to capture the biometric data of the user.

If the captured device biometric data does not correspond to the authorized biometric data 618, the user may be prompted to provide the biometric data again, or the user authentication may fail. The biometrics application 614 reports the comparison results to the e-wallet application 612, which then either completes the payment transfer if the authentication was successful, or refuses the payment transfer if the authentication fails.

In the illustrative embodiments of FIG. 6, the processor 620 is further configured to enable the e-wallet application 612 to communicate with the backend server(s) of the service provider of the e-wallet platform to perform the functions of the interactive application described herein. For example, the communication interface 630 of FIG. 6 may include an antenna (not shown) operatively coupled to a transmitter and receiver 632. The processor 620 is configured to provide signals to and receive signals from the transmitter and receiver 632. These signals include signaling information in accordance with the air interface standard of the applicable cellular system of the wireless telephone network (such as a second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like) and/or in accordance with non-cellular communication mechanisms, such as via a wireless local area network (WLAN), wired local network (LAN), or other communication/data networks.

As described herein, the mobile device 600 includes a user interface that includes input devices 650 for entering data by the user of the mobile device 600, such as in response to prompts of the e-wallet application 612 or biometrics application 614, and/or output devices 660 for outputting data to the user of the mobile device 600, such as prompts, information concerning the payment transfer, electronic payment transfer history, and other information. The user input devices 650 include, but are not limited to, any number of devices allowing the mobile device 600 to receive data from the user, such as a keypad, keyboard, touch-screen, touchpad, microphone, mouse, joystick, stylus, other pointer device, button, soft key, and/or other input device(s). The user output devices 660 include, but are not limited to, a mobile display (e.g., a liquid crystal display (LCD), touch screen, or the like) and a speaker or other audio device. Both input and output devices are operatively coupled to the processor 620.

The mobile device 600 further includes a power source 640 for supplying energy needed to operate the mobile device. The power source 640 includes, but is not limited to, a battery (e.g., a lithium battery, a nickel-metal hydride battery, or the like) and/or a power adapter that can connect a power supply from a power outlet to the mobile device 600.

FIG. 6 shows only an exemplary mobile device suitable to host and support an e-wallet application with the expanded functionality. A person skilled in the art would appreciate that other electronic devices, such as desktop computers, laptops, notebooks, tablets, and the like, may be used to facilitate direct electronic payment transfers through use of such electronic devices in the manner described herein in respect of FIGS. 1 to 5 and 7, and be configured accordingly. Furthermore, although the biometrics reader 670 is described herein as being integrated with the mobile device 600, the biometrics reader may be an external device attachable to the mobile device 600, or the electronic device.

Figure 7:
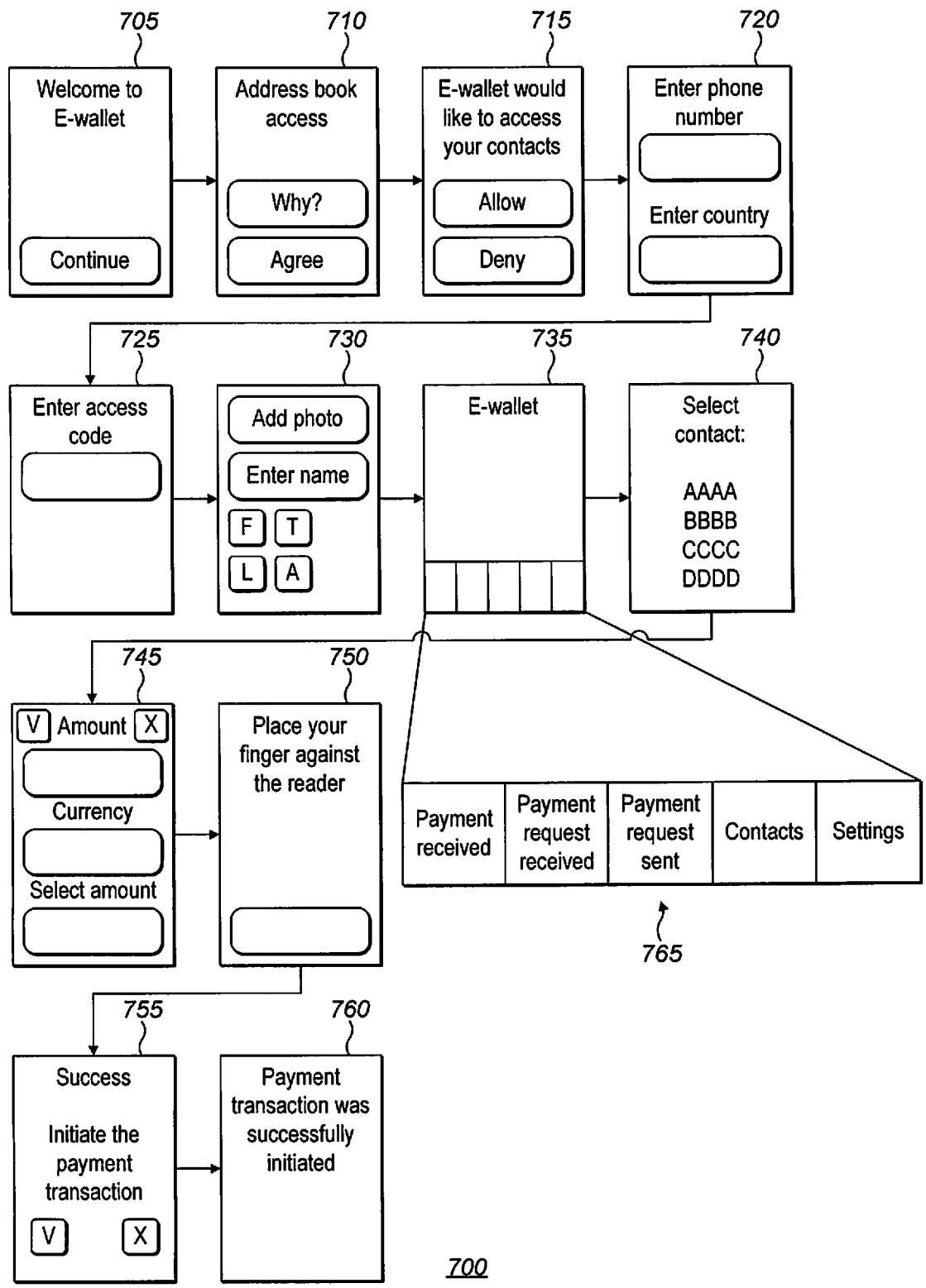
FIG. 7 depicts a simplified diagram of a series of screen shots of an e-wallet application in accordance with some embodiments of the disclosure.

FIG. 7 depicts a simplified diagram 700 of a series of screen shots of a user interface (UI) for an e-wallet application, in accordance with some embodiments of the disclosure. Screen 705 is a UI welcome screen, which may, for example, be displayed to a user of a mobile device after the user downloads the e-wallet application to the mobile device. Once the user selects 'continue,' the e-wallet application displays screen 710 at which the user is requested to allow the e-wallet application to access the user's address book application, installed on the mobile device. The user can agree to grant access by selecting a corresponding button, or inquire for further information concerning access of the e-wallet application to the address book application. If the user seeks further information, another screen or an overlay including information on how the e-wallet may use such access is displayed (not shown).

At screen 715, the user is requested to provide access to contacts in the address book application. In some embodiments, the user is enabled to grant selective access to his or her contacts, for example, by granting access only to a certain group of contacts, (e.g., friends, business, etc.), or by selecting them individually.

At screen 720, the user is requested to provide the number of the mobile device and country (or enter a country/area code). This information is used to facilitate user's/mobile device's authentication. In particular, an access code is generated at a back-end server and sent to the user as an SMS message. The user enters the access code at screen 725 to complete registration of the e-wallet application.

At screen 730, the user is invited to add his photo, enter his name, and link social media applications selectively, e.g., Facebook™ ('F'), Twitter® ('T'), and/or LinkedIn® ('L'), or all social media applications ('A') installed on the mobile device by selecting respective buttons on screen 730. In some embodiments, it is not necessary for a social media application to be installed on the mobile device. Instead, the user is invited to indicate the social media account and associated credentials to enable the e-wallet application to access the user's contacts from that social media account, for example, through a browser.

Screen 735 is a working screen of the e-wallet application that includes a number of icons for accessing different services/functionalities provided by the e-wallet application (shown at 765). Such a screen is typically displayed to the user every time the user initiates the e-wallet application on his or her mobile device. On that screen, the user is able to see the history and status of prior electronic payment transfers (by selecting 'payment received,' 'payment request received,' 'payment request sent'), change settings of the e-wallet application, such as notification preferences, register accounts, link contacts, and the like (by selecting 'settings'), and initiate a new electronic payment transfer or request for a new electronic payment transfer (by selecting 'contacts'). Further, messages received through the e-wallet application, such as concerning the status of a particular payment transfer or request for a payment transfer may be displayed on screen 735 as well (not shown).

Once the user selects the 'contacts' icon on the screen 735, the user is taken to screen 740, where the user is able to select a payee from the available contacts for initiating a payment transfer or a payer for initiating a payment transfer request. As discussed herein, the available contacts include contacts linked from other application(s) installed on the mobile device, such as an address book or a social media application, and/or from the linked websites, such as social media sites, business sites, etc. The user further selects a type of the payment transaction he or she desires to initiate, such as a payment transfer to the selected payee or a payment transfer request from the selected payer (not shown).

Screen 745 is displayed when the user selects to initiate the payment transfer to the selected payee. At screen 745, the user is invited to enter the amount of the payment transfer and select one of the account(s) registered with the e-wallet application. In some embodiments, the payment transfer may be initiated in a number of currencies. The currency of the payment transaction may be set by default, selected to correspond the currency of the selected account, or selected by the user. The user confirms his or her selections by pushing the 'V' button, which takes the user to UI screen 750.

At screen 750, the user is invited to confirm his or her identity by placing his or her finger(s) against a biometrics reader of the mobile device, which scans the user's fingerprint(s). If the scanned fingerprint(s) matches the authorized fingerprint(s), the authentication is successful and the user is invited to confirm at screen 755 that he or she wishes to initiate the payment transaction by selecting the 'V' button. At screen 760, a confirmation that the requested payment transaction was initiated successfully is displayed. As discussed herein, other authentication methods may be used as well or instead.

The UI described in respect of FIG. 7 is only a simplified example of some of the functionalities and processes of the e-wallet application discussed herein in respect of FIGS. 1 to 6. A person skilled in the art would appreciate that the other functionalities and processes described herein can be implemented in a similar or different manner and that the principles and techniques described herein are not limited to the UI interface of FIG. 7.

Furthermore, the e-wallet application is described herein as being linked to other applications installed on the electronic device to enable access to contact/identification information stored in association with such other applications. However, the e-wallet application may be linked to some other applications installed on the electronic device to provide for some additional functionality in association with the e-wallet application. For example, the e-wallet application may be linked to a calendar application for setting reminders for repeating payment transfers and invoking the e-wallet application in response to such reminders. Therefore, in some embodiments, once a user initiates an electronic payment transfer or an electronic payment transfer request, the e-wallet applications enables the user to set such a transfer or request to be repeated in accordance with a pre-defined schedule. The repeated transfers/requests may be performed automatically, without further input from the user of the electronic device, or set as respective reminders to perform the transfer/request in the calendar application.

Subsequently, once a reminder is displayed to the user, the e-wallet application may be invoked directly from the reminder with all the information concerning the transfer/request being pre-filled. The user is enabled to change such information as desired before completing the transfer/request.

The order of execution or performance of the operations and/or steps in the embodiments illustrated and described herein is not essential, unless otherwise specified. Accordingly, the operations/steps may be performed in any order, unless otherwise specified, and embodiments may include additional or fewer operations/steps than those disclosed herein. It is further contemplated that executing or performing a particular operation/step before, contemporaneously with, or after another operation, is in accordance with the described embodiments, unless otherwise specified. Also, features described with respect of only some of the Figures are transferable to the embodiments described in respect of the other Figures, unless otherwise specified.

The methods described herein may be encoded as executable instructions embodied in a computer readable medium, including, without limitation, nontransitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, CDs (compact discs), DVDs (digital versatile discs), or other media that are capable of storing code and/or data.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

The functions and/or steps and/or operations included herein, in some embodiments, may be described in computer executable instructions stored on a computer readable media (e.g., in a physical, tangible memory, etc.), and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

Further, it should be appreciated that one or more aspects of the present disclosure transform a general-purpose computing device into a special-purpose computing device when configured to perform the functions, methods, and/or processes described herein.

Whilst the disclosure has been described in terms of various specific embodiments, the skilled person would recognize that the disclosure can be practiced with modification within the spirit and scope of the claims. Other embodiments will be apparent to those skilled in the art from consideration of the specification and practice of the embodiments disclosed herein. It is intended that the specification and examples be considered as exemplary only, with a true scope and spirit of the disclosure being indicated by the following claims. In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method of requesting, from a mobile device, an electronic payment transfer from a payer, the method comprising:

receiving, by a mobile device, a user selection of identification information of a payer at a first application installed on the mobile device, the first application including at least one of: a social media application, an address book application, and/or a browser application;

in response to the user selection:
receiving, by the mobile device, from the first application installed on the mobile device, the identification information of the payer;

invoking, by the mobile device, a second application installed on the mobile device, wherein the second application is different from the first application, and wherein the second application includes an e-wallet application; and automatically transferring, by the mobile device, the identification information from the first application to the second application;

after invoking the second application and transferring the identification information from the first application to the second application, receiving, by the mobile device, via the second application, a user identification of a payment amount;

after receiving the identification information of the payer from the first application and the user identification of the payment amount via the second application:
capturing, by the mobile device, at a biometrics reader of the mobile device, biometric data of the user; and comparing the captured biometric data to authorized biometric data to authenticate the user;

when the user is authenticated in connection with requesting an electronic payment transfer from the payer, based on a match of the captured biometric data and the authorized biometric data, initiating, from the mobile device, a request for the electronic payment transfer from the payer associated with the received identification information to the user for the payment amount;

receiving a message indicating that the electronic payment transfer is ready for deposit;

capturing, at the biometrics reader of the mobile device, second biometric data of the user;

comparing the captured second biometric data to the authorized biometric data to authenticate the user; and initiating, from the mobile device, upon successful authentication of the user, deposit of the electronic payment transfer into an account.

2. The method according to claim 1, further comprising accessing identification data of the first application from the second application to enable the user to select the payer.

3. The method according to claim 1, further comprising, after initiating the request for the electronic payment transfer, receiving, at the mobile device, one or more alerts indicating a status of the electronic payment transfer, wherein the one or more alerts comprise one or more of an email, an SMS message, a social media message, a message received through the second application, and/or an automated voicemail message.

4. The method according to claim 3, wherein the one or more alerts comprise at least one of: a confirmation that the payer received the request for the electronic payment transfer, a confirmation that the payer initiated the electronic payment transfer, a confirmation that the electronic payment transfer is ready for acceptance, and/or a confirmation that the electronic payment transfer was deposited to the account of the user.

5. The method according to claim 1, further comprising receiving, via the second application installed on the mobile device, a user selection of the account, registered with the second application, for accepting the electronic payment transfer.

6. The method according to claim 1, wherein initiating the deposit of the electronic payment transfer comprises:

determining, to complete the electronic payment transfer, an amount for depositing into the account based on one or more of: the payment amount, a transfer fee associated with the electronic payment transfer, and/or a predefined limit associated with the electronic payment transfer; and initiating, automatically, a pre-defined donation transfer from the account in association with the deposit of the electronic payment transfer, wherein the pre-defined donation transfer is a separate transaction linked to the deposit of the electronic payment transfer, or a respective donation transfer amount is deducted from the electronic payment transfer prior to the deposit.

7. The method according to claim 1, wherein the identification information comprises one or more of an email address, a phone number, and/or social media identification information; and wherein the payer is a person or a business entity.

8. The method according to claim 1, wherein the second application is invoked, by the mobile device, in response to receiving the identification information of the payer; and wherein invoking the second application comprises one of: bringing the second application, running in a background of the mobile device, into a foreground of the mobile device or launching the second application.

9. The method according to claim 1, wherein initiating the deposit of the electronic payment transfer comprises initiating a pre-defined donation transfer from the account in association with the deposit of the electronic payment transfer, wherein the pre-defined donation transfer is a separate transaction linked to the deposit of the electronic payment transfer, or a respective donation transfer amount is deducted from the electronic payment transfer prior to the deposit.

10. The method according to claim 1, wherein initiating the deposit of the electronic payment transfer comprises determining, to complete the electronic payment transfer, an amount for depositing into the account based on one or more of: the payment amount, a transfer fee associated with the electronic payment transfer, and/or a predefined limit associated with the electronic payment transfer.

11. A mobile device comprising:

memory storing a plurality of applications including a first application and a second application, wherein the second application is different from the first application, and wherein the second application includes an e-wallet application;

a biometrics reader configured to capture biometric data of a user of the mobile device; and one or more processors configured to:

receive, from the first application of the plurality of applications, identification information of a payer based on a user selection at the mobile device;

automatically transfer the identification information from the first application to the second application;

receive, via the second application of the plurality of applications, a user identification of a payment amount;

after receiving the identification information of the payer from the first application and the user identification of the payment amount via the second application, initiate, upon successful authentication of the user based on biometric data captured for the user at the biometric reader, a request for the electronic payment transfer from the payer associated with the received identification information to the user for the payment amount;

receiving a message indicating that the electronic payment transfer is ready for deposit; and upon successful authentication of the user based on additional biometric data captured for the user at the biometrics reader, after receiving the message, initiate deposit of the electronic payment transfer into an account.

12. The mobile device of claim 11, wherein the one or more processors are further configured to receive, via the second application, a user selection of the account, registered with the second application, for accepting the electronic payment transfer.

13. The mobile device of claim 12, wherein the first application is a social media, address book, or browser application.

14. The mobile device of claim 11, wherein the identification information comprises one or more of an email address, a phone number, and/or social media identification information; and wherein the payer is a person or a business entity.

15. The mobile device of claim 11, wherein the one or more processors are configured to, after initiating the request for the electronic payment transfer, receive one or more alerts indicating a status of the electronic payment transfer; and wherein the one or more alerts comprise one or more of an email, an SMS message, a social media message, and a message received through the second application, and/or an automated voicemail message.

* * * * *